United States Patent [19]

Joyal et al.

[11] B 3,996,670

[45] Dec. 14, 1976

[54] PROTRACTOR WITH DIGITAL READOUT

[75] Inventors: George J. Joyal, Chicopee, Mass.;
George H. Gakeler, Vernon, Conn.

[73] Assignee: United Technologies Corporation,
Hartford, Conn.

[22] Filed: Aug. 19, 1974

[21] Appl. No.: 498,820

[44] Published under the second Trial Voluntary Protest Program on March 9, 1976 as document No. B 498,820.

[52] U.S. Cl. .............................. 33/174 S; 33/1 PT
[51] Int. Cl.² ...................... G01B 3/30; G01B 5/24
[58] Field of Search ......... 33/75 R, 174 P, 174 PA, 33/174 PB, 174 PC, 174 TA, 1 PT, 174 S, 174 TC

[56] References Cited

UNITED STATES PATENTS

| | | | |
|---|---|---|---|
| 2,000,926 | 5/1935 | Cox .................................... | 33/75 R |
| 2,359,018 | 9/1944 | Balk ................................... | 33/174 S |
| 2,369,425 | 2/1945 | Becker ............................... | 33/174 TC |
| 2,397,300 | 3/1946 | Tilton ................................ | 33/174 S |
| 2,481,062 | 9/1949 | Anderson .......................... | 33/75 R |
| 3,195,410 | 7/1965 | Colten et al. .................... | 33/174 P X |
| 3,816,930 | 6/1974 | Edenholm ........................ | 33/174 TA |

FOREIGN PATENTS OR APPLICATIONS

| | | | |
|---|---|---|---|
| 915,226 | 1/1963 | United Kingdom ............. | 33/174 P |

*Primary Examiner*—Richard E. Aegerter
*Assistant Examiner*—Charles E. Phillips
*Attorney, Agent, or Firm*—John D. Del Ponti; Norman Friedland

[57] ABSTRACT

A protractor having a sine bar connected to the shaft of an electronic encoder and supported to a carriage movable axially and horizontally, but retained in fixed relationship to a table supporting a propeller for measuring and inspecting the blade angles thereof is characterized by its improved accuracy and repeatability.

5 Claims, 7 Drawing Figures

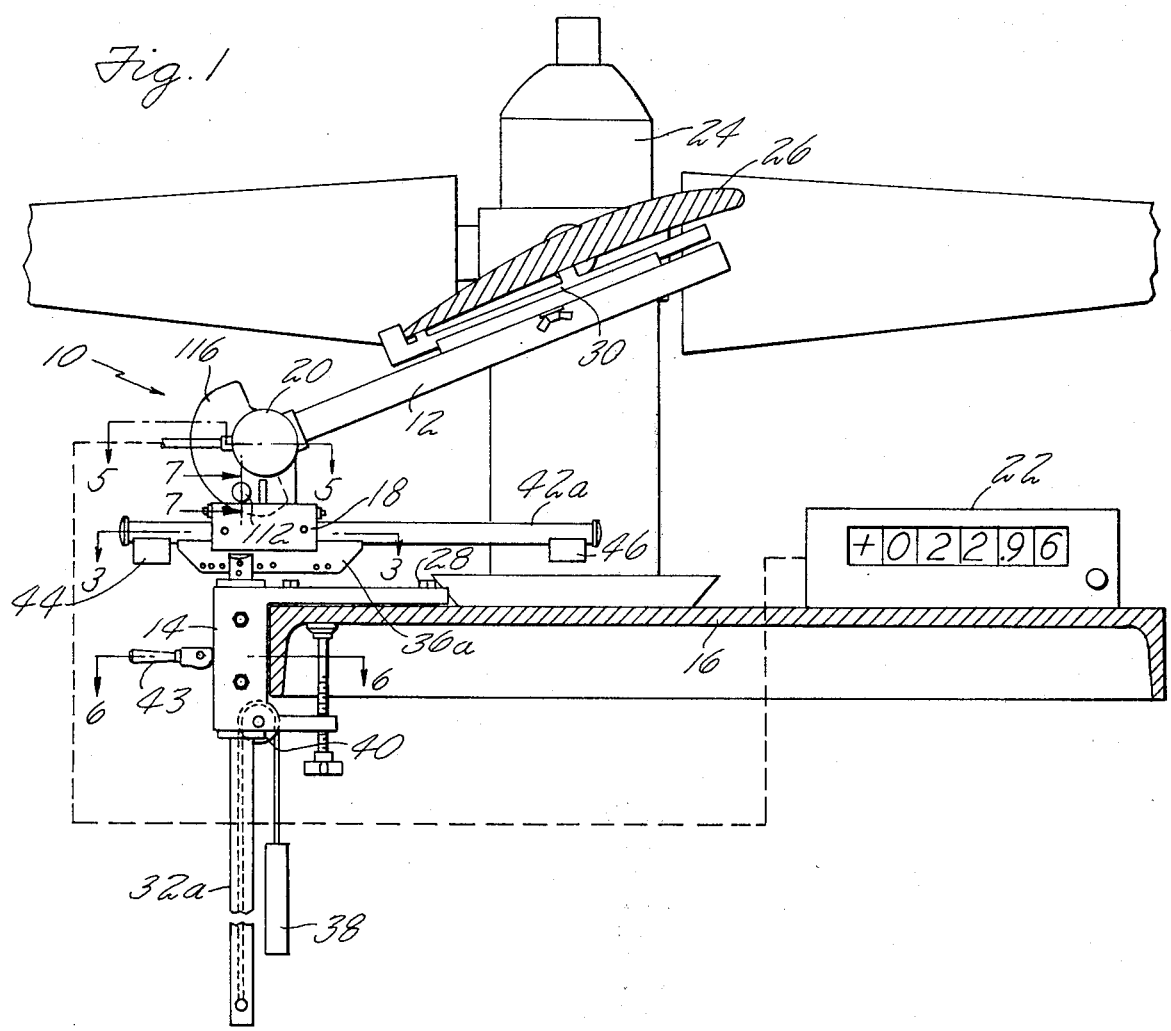
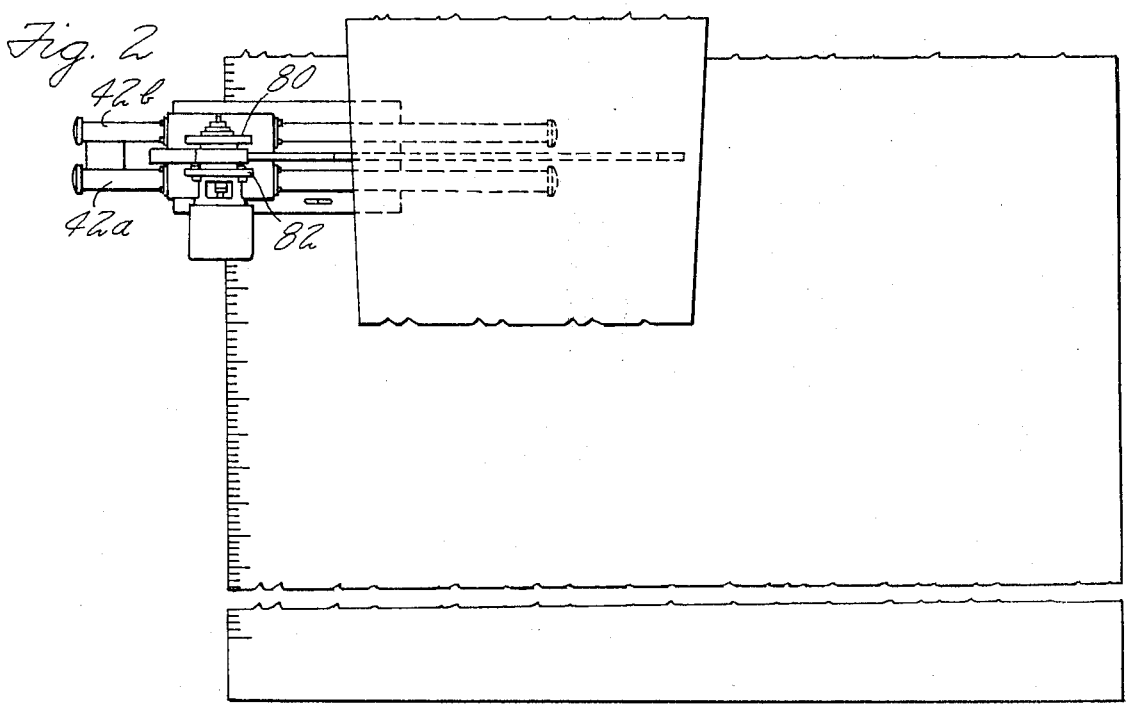

PROTRACTOR WITH DIGITAL READOUT

BACKGROUND OF THE INVENTION

This invention relates to a protractor for measuring the blade angle of a propeller, fan and the like and particularly to the incorporation of an electronic shaft angle encoder and a complementary digital readout coupled to a movable carriage for positioning the sine bar in relationship to the propeller, blade station and supporting table.

The prior art protractor is exemplified in U.S. Pat. No. 2,481,062 granted to O. L. Anderson on Sept. 6, 1949 and assigned to the same assignee and typifies the type heretofore used for measuring blade angle. Because this type of protractor is positioned, held in place and set solely by the operator, and the reading of the scale is no better than the accuracy of the reader, such a device while adequate is not sufficiently accurate for certain aircraft applications. Not only is it difficult to obtain repeatability when a single operator makes a measurement, the inaccuracies are generally compounded when more than one operator does the reading.

Thus, in applications where it is desirable to obtain an accuracy of say 0.01 of a degree of the blade angles amongst the blades in a propeller, regardless of the number of blades, the heretofore measurement devices are not adequate. We have found that we can obviate the problems of the heretofore known protractors by leveling and fixing the protractor base to the table, allowing the protractor to move perpendicular and parallel to the table top surface while restraining it from tilting or cocking in any direction and employing a shaft angle encoder mounted through a flexible bellows that is electronically connected to a complementary digital readout so that the blade angle is seen in digits in the window of the viewer and hence eliminates the necessity of the viewer from reading a scale, as the case was heretofore.

SUMMARY OF THE INVENTION

An object of this invention is to provide an improved protractor for measuring the blade angle of a blade of a propeller, fan and the like.

A still further object of this invention is to provide for a protractor a shaft angle encoder cooperating with an electronic digital readout for measuring and viewing the blade angle of a blade of a propeller, fan or the like at a predetermined blade station. Another feature is the positioning and clamping of the protractor relative to the propeller center-line, blade station and supporting table.

Other features and advantages will be apparent from the specification and claims and from the accompanying drawings which illustrate an embodiment of the invention.

BRIEF DESCRIPTION OF THE DRAWINGS

FIG. 1 is a side elevation, partly in section, illustrating the invention measuring the blade angle of the propeller blades.

FIG. 2 is a top plan view of the protractor of FIG. 1 showing the space relationship of the blade relative to the table and protractor for blade angle measurement at a given blade station.

DESCRIPTION OF THE PREFERRED EMBODIMENT

Figure 3:
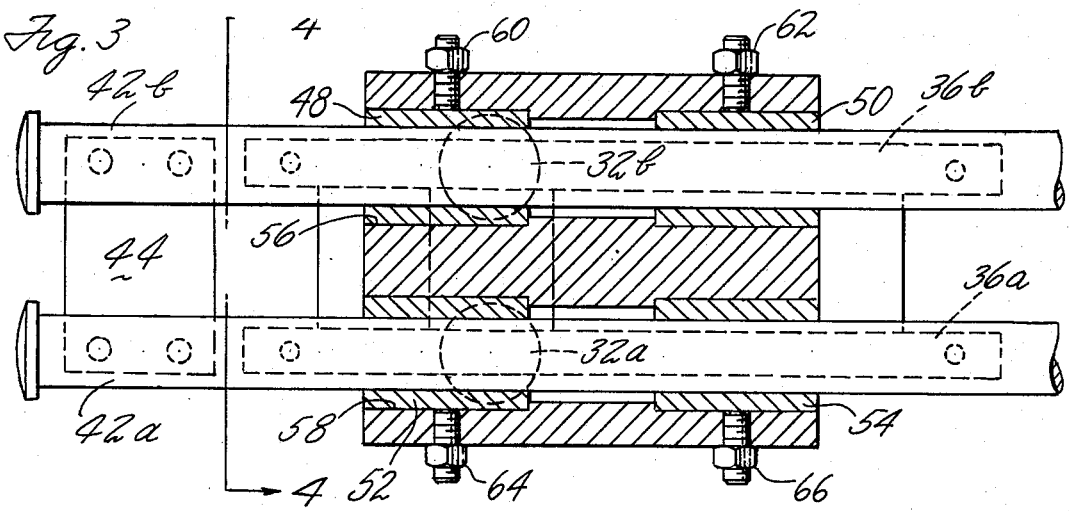
FIG. 3 is a section taken through 3—3 of FIG. 1.
Figure 4:
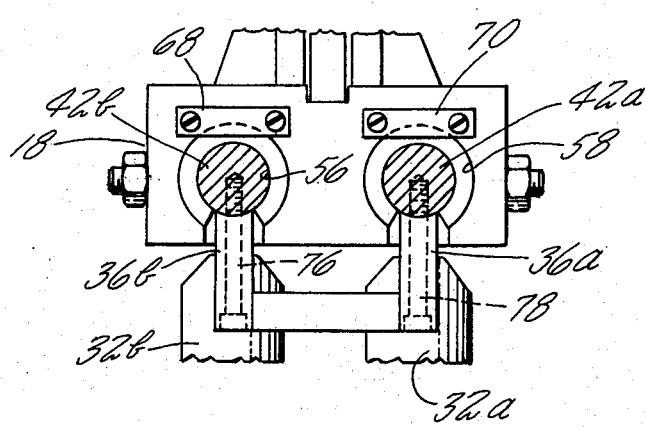
FIG. 4 is a section taken along line 4—4 of FIG. 3.

The invention is best illustrated by referring to FIGS. 1 through 5 showing the improved protractor generally illustrated by reference numeral 10 comprising sine bar 12, table clamp 14 for supporting sine bar 12 to table 16, carriage 18, encoder 20 and digital readout 22. Under typical conditions the propeller is rotary mounted on a suitable fixture firmly secured to the table having suitable means for actuating the pitch. Once the pitch is selected, the propeller is rotated so that the blade to be measured extends longitudinally over the table. The clamp 14 is adjusted so as to be level using the three adjusting screws 28 bearing against the surface of the table and a suitable visible bubble level. In this manner the protractor can be secured at a predetermined position relative to the blade, say 90° relative to the blade center-line, at a predetermined blade station while eliminating the possibility of being moved as was the case heretofore when the operator held it in his hand or supported it against the table top. It will be appreciated that the sine bar 12 is formed with a slot in either edge to accommodate a template similar to template 30 that is designed for different blades and their respective surfaces. Template 30 may be secured in place by suitable thumb screws.

Carriage 18 is movable vertically as well as horizontally and runs parallel to the table surfaces, thus eliminating one source of inaccuracy. A pair of spaced rods 32a and 32b are slidably mounted in bores formed in clamp 14 and have one end attached to the carriage support. The support comprises a pair of plates 36a and 36b supporting rods 42a and 42b serving to permit the raising or lowering of the carriage 18 parallel relative to the table surface. A free-falling weight 38 is attached to rod 32 at one end through the pulley 40 to balance the weight of the carriage and attachments for ease of movement and holding the protractor in place. The locking lever 43 permits the operator to lock the carriage in vertical position once the height has been established.

Carriage 18 may also be moved horizontally and is slidably mounted on spaced rods 42a and 42b which are supported by members 36a and 36b and spaced by spacers 44 and 46. For a better view of this connection as best noted in FIG. 3 bushings 48, 50, 52 an 54 fitted into longitudinal bores 56 and 58 formed in carriage 18 supports carriage 18. The bushings are adjustable therein by bolt/nut arrangements 60, 62, 64 and 66 respectively, and serve to adjust the frictional engagement and hence the ease of the horizontal movement. Plates, such as 68 and 70 shown in FIG. 4, screwed to the ends of carriage slightly overlying the bores 56 and 58 on either end prevent the bushings from sliding out.

The horizontal rods 42a and 42b are bolted to the support members 36a and 36b by bolts 76 and 78. This construction assures an exact right angle relationship between the horizontal and vertical rods, thus assuring that carriage 26 will always be exactly parallel to the table top. A gage adaptable to be placed on the horizontal rods is calibrated so that when sine bar 12 rests thereon the angle is 0.0°. From this position the digital readout 22 can be adjusted to the 0.0° setting. A suitable commercially available digital readout is one obtained, for example, from the Dynamics Research Corporation, 50 Concord Street, Wilmington, Massachusetts, model described in its bulletin 16-100. A suitable shaft angle encoder is also available from the same company such as DRC Model 35. Encoder 20 is suitably attached to the spaced upstanding wall members 80 and 82 and its shaft 84 is suitably attached to shaft 86 pivotally supporting sine bar 12 by flexible bellows 87. Shaft 86 is journalled in bores 88 and 90 formed in members 80 and 82 and may be supported by suitable journal bearings 92 and 94.

From the foregoing it is apparent that rotational movement of sine bar 20 is reflected in rotational movement of shaft 84 for imparting a readout signal from the encoder to the digital readout 22 which is electrically connected thereto. Thus, as shown in FIG. 1 the position of template 30 relative to the blade measures a blade angle of 22.96°. The operator neither has to read a scale as the case was heretofore nor does he have to hold on to the protractor.

Figure 6:
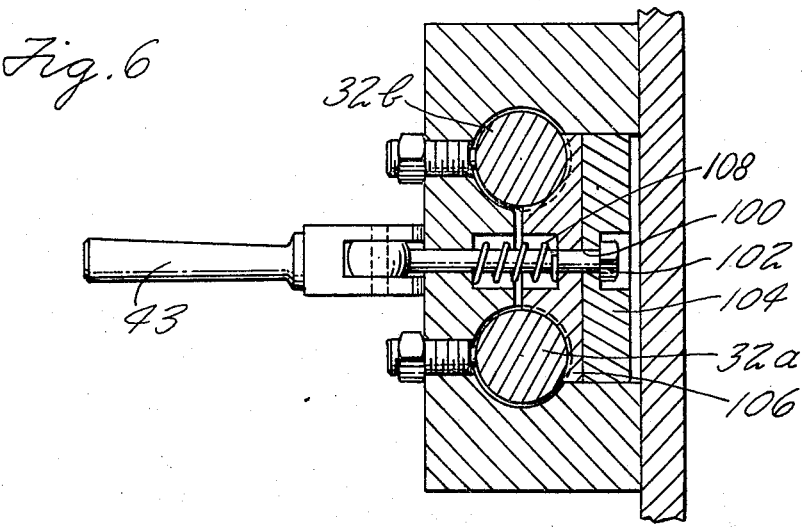
FIG. 6 is a section taken through 6—6 of FIG. 1.
Figure 5:
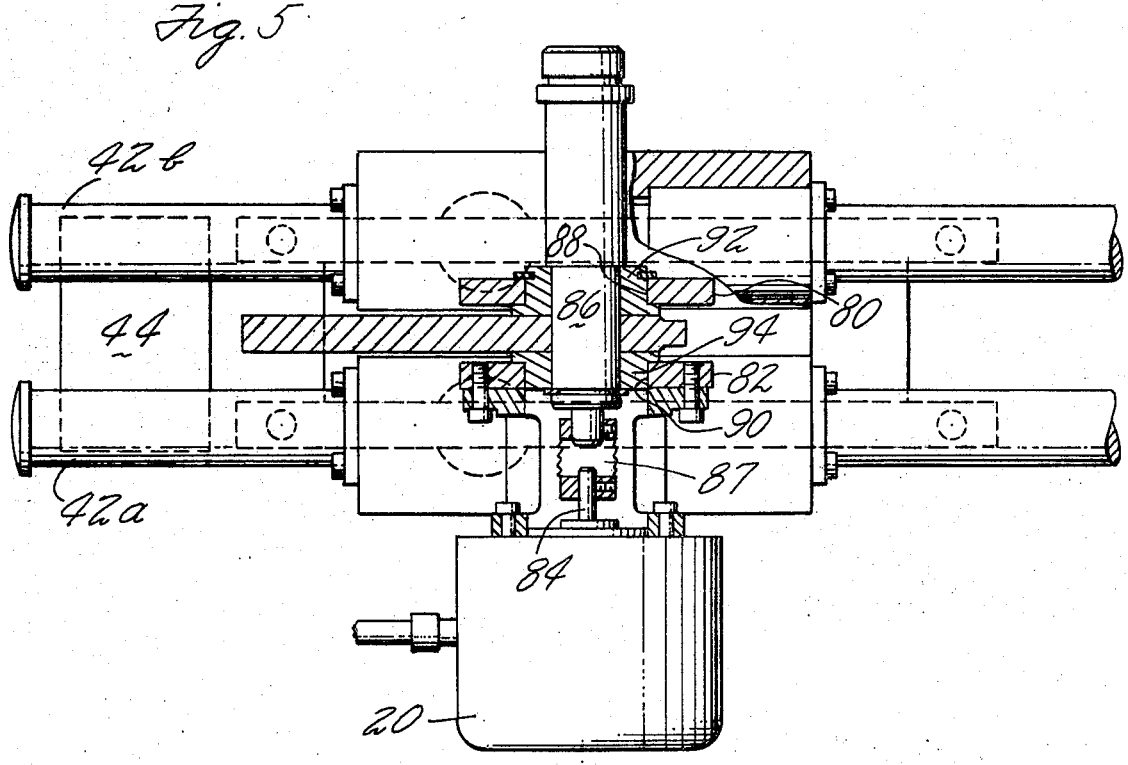
FIG. 5 is a section taken through 5—5 of FIG. 1.
Figure 7:
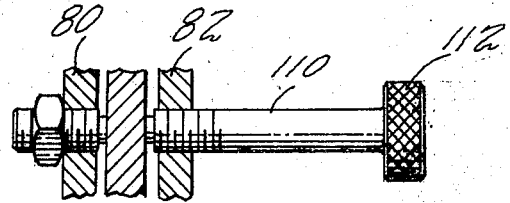
FIG. 7 is a section taken along line 7—7 of FIG. 1.

To facilitate the holding of the carriage once placed in the proper position the locking mechanism for the vertical movement is provided as shown in FIG. 6 and means for locking the protractor in position is shown in FIG. 7. As can be seen in FIG. 6 lever 43 is pinned at its bifurcated end to pull rod 100 and the end face is cammed to bear against the face of clamp 14. The head 102 of rod 100 abuts against clamping element 104 which, in turn, adjusts the clamp 106 to bear against the rods 32a and 32b when lever 43 is in the position shown. Spring 108 biases rod 102 rightwardly to release element 106 from bearing against rods 32a and 32b.

Bolt 110 having the knurled handle 112 is threadly fitted into member 82 and is adapted to bear against the weighted end 116 of sine bar 12. This serves to hold sine bar in any selected position.

By virtue of this invention the carriage 18 can be locked at any height, and the sine bar 12 to any angle. The blade angle is read directly from the digital readout 22. This eliminates operator interpretation of degree lines as on conventional blade angle protractors. The electronic protractor can be clamped onto the table at any airfoil station, 42'', 48 , and 54 etc. It can be used in setting and reading angles of various propeller assemblies and its repeatability of readings excellent.

The protractor may be calibrated by metrology on a predetermined length of timeused basis to assure continued accuracy.

It should be understood that the invention is not limited to the particular embodiments shown and described herein, but that various changes and modifications may be made without departing from the spirit or scope of this novel concept as defined by the following claims.

We claim:

1. A propeller protractor for measuring the blade angle of the blades thereof including a clamp removably fixed to a table supporting the propeller whose blades are intended to be measured and located at a fixed relationship to the station of that blade, a first pair of spaced rod like elements extending vertically relative to the top surface of said table slidably supported in said clamp, a second pair of spaced rod-like elements extending horizontally relative to said top surface attached to said first pair of spaced rod like elements, and movable vertically but remaining in a predetermined parallel relationship to said top surface, a carriage slidably mounted on said second pair of spaced rod like elements, a sine bar pivotally connected at one end to said carriage adapted to be angularly moved to abut against a surface of the blade to be measured, a shaft angle encoder secured to said carriage and connected to the pivoted end of said sine bar to be rotated thereby, a digital readout electrically connected to said shaft angle encoder being programmed to give a digital representation of the angle relationship of said sine bar and a viewer on said readout recording said readout value.

2. A protractor as claimed in claim 1 including means for locking said first pair of parallel rod like elements in said clamp.

3. A protractor as claimed in claim 1 including means for locking said sine bar in a given angular position.

4. A protractor as claimed in claim 1 including a free-falling weight attached to at least one of said first pair of rod like element and a pulley over which said weight is guided.

5. A protractor as claimed in claim 1 including a flexible bellows interposed between said sine bar and said encoder for interconnecting the same.

* * * * *